United States Patent [19]

Netz, Sr.

[11] Patent Number: 5,437,424
[45] Date of Patent: Aug. 1, 1995

[54] SEPTIC PIPE FIELD DRAIN HOLDERS

[76] Inventor: John H. Netz, Sr., 17540 Lappans Rd., St James, Md. 21781

[21] Appl. No.: 239,448

[22] Filed: May 9, 1994

[51] Int. Cl.⁶ ............................................. F16L 3/00
[52] U.S. Cl. ...................................... 248/49; 405/154
[58] Field of Search ..................... 248/49, 85, 87; 405/154, 157, 172; 52/165

[56] References Cited

U.S. PATENT DOCUMENTS

| | | | |
|---|---|---|---|
| 3,170,663 | 2/1965 | Fite | 248/49 |
| 3,227,408 | 1/1966 | Reed | 248/87 |
| 3,568,455 | 3/1971 | McLaughlin | 405/154 |
| 4,126,012 | 11/1978 | Waller | 248/85 X |
| 4,492,493 | 1/1985 | Webb | 405/154 X |
| 5,007,768 | 4/1991 | Waller | 405/172 X |
| 5,242,247 | 9/1993 | Murphy | 248/49 X |

FOREIGN PATENT DOCUMENTS 150538  10/1931  Switzerland ........................ 248/49

Primary Examiner—J. Franklin Foss

[57] ABSTRACT

A septic pipe field drain holder comprising a vertically disposed shaft having a lower pointed end and an upper pressure applying end; a pair of horizontally disposed support rods coupled to and extending radially from the shaft in a horizontal orientation at intermediate points along the length of the shaft, the support rods having interior ends coupled to the shaft and exterior ends forming an opening for the receipt of a pipe to be supported, each of the support rods having a vertically disposed aperture in axial alignment adjacent the exterior ends to secure a pipe therewithin during operation and use; and a supplemental horizontal rod extending horizontally above the pair of horizontal support rods for applying pressure to drive the shaft downwardly.

1 Claim, 4 Drawing Sheets

SEPTIC PIPE FIELD DRAIN HOLDERS

BACKGROUND OF THE INVENTION

1. Field of the Invention

The present invention relates to septic pipe field drain holders and more particularly pertains to holding septic pipes prior to final positioning and leveling through a series of reusable holders.

2. Description of the Prior Art

The use of septic pipe devices and mechanisms for holding pipes is known in the prior art. More specifically, septic pipe devices and mechanisms for holding pipes heretofore devised and utilized for the purpose of aligning septic pipes in a horizontal orientation are known to consist basically of familiar, expected, and obvious structural configurations, notwithstanding the myriad of designs encompassed by the crowded prior art which has been developed for the fulfillment of countless objectives and requirements.

In this respect, the septic pipe field drain holders according to the present invention substantially departs from the conventional concepts and designs of the prior art, and in doing so provides an apparatus primarily developed for the purpose of holding septic pipes prior to final positioning and leveling through a series of reusable holders.

Therefore, it can be appreciated that there exists a continuing need for new and improved septic pipe field drain holders which can be used for holding septic pipes prior to final positioning and leveling with the held pipes being supported through a series of reusable holders. In this regard, the present invention substantially fulfills this need.

SUMMARY OF THE INVENTION

In view of the foregoing disadvantages inherent in the known types of septic pipe devices and mechanisms for holding pipes now present in the prior art, the present invention provides an improved septic pipe field drain holders. As such, the general purpose of the present invention, which will be described subsequently in greater detail, is to provide a new and improved septic pipe field drain holders and method which has all the advantages of the prior art and none of the disadvantages.

To attain this, the present invention essentially comprises a new and improved septic pipe field drain holder comprising, in combination, a vertically disposed shaft having a lower pointed end and an upper pressure applying end; a pair of horizontally disposed support rods extending radially from the shaft in a horizontal orientation at intermediate points along the length of the shaft, the support rod having interior ends coupled to the shaft and exterior ends forming an opening for the receipt of a pipe to be supported, each of the support rods having a vertically disposed aperture in axial alignment adjacent the exterior ends to secure a pipe therewithin during operation and use; a supplemental horizontal rod extending horizontally above the pair of horizontal support rods for applying pressure to drive the shaft downwardly; a pin positionable through the apertures of the support rods for locking the pipe in position therebetween; and a chain having a lower end secured to the upper extent of the pin and an upper end secured to the pipe adjacent to the supplemental horizontal rod.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved septic pipe field drain holders which have all the advantages of the prior art septic pipe devices and mechanisms for holding pipes and none of the disadvantages.

It is another object of the present invention to provide new and improved septic pipe field drain holders which may be easily and efficiently manufactured and marketed.

It is further object of the present invention to provide new and improved septic pipe field drain holders which are of durable and reliable constructions.

An even further object of the present invention is to provide new and improved septic pipe field drain holders which are susceptible of a low cost of manufacture with regard to both materials and labor, and which accordingly are then susceptible of low prices of sale to the consuming public, thereby making such septic pipe field drain holders economically available to the buying public.

Still yet another object of the present invention is to provide new and improved septic pipe field drain holders which provide in the apparatuses and methods of the prior art some of the advantages thereof, while simultaneously overcoming some of the disadvantages normally associated therewith.

Still another object of the present invention is to hold septic pipes prior to final positioning and leveling through a series of reusable holders.

Lastly, it is an object of the present invention to provide new and improved septic pipe field drain holder comprising a vertically disposed shaft having a lower pointed end and an upper pressure applying end; a pair of horizontally disposed support rods coupled to and extending radially from the shaft in a horizontal orientation at intermediate points along the length of the shaft, the support rods having interior ends coupled to the shaft and exterior ends forming an opening for the receipt of a pipe to be supported, each of the support rods having a vertically disposed aperture in axial alignment adjacent the exterior ends to secure a pipe therewithin during operation and use; and a supplemental horizontal rod extending horizontally above the pair of horizontal support rods for applying pressure to drive the shaft downwardly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
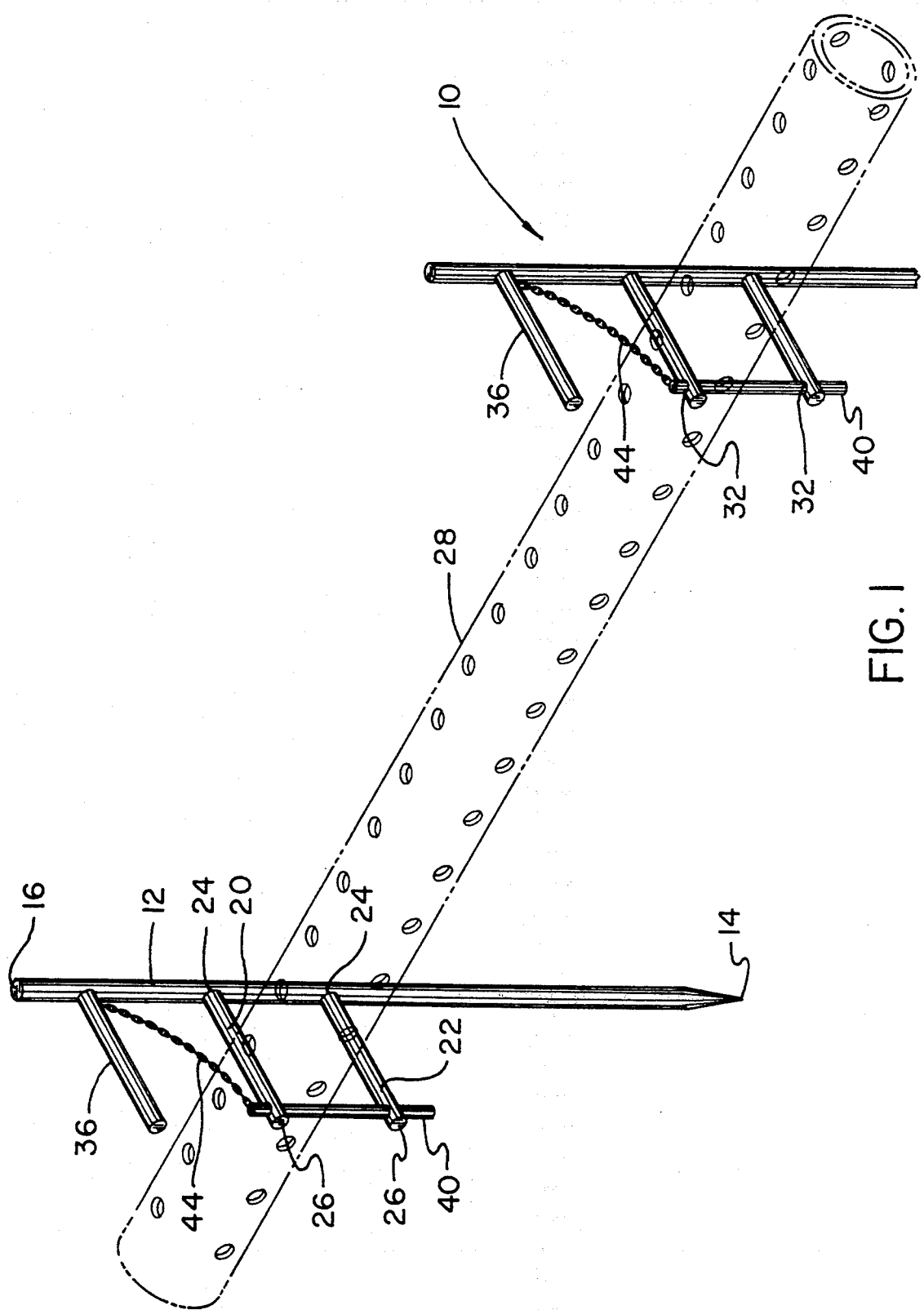
FIG. 1 is a perspective view of the preferred embodiment of the septic pipe field drain holders constructed in accordance with the principles of the present invention and illustrating in dotted line a septic pipe being held.

With reference now to the drawings, and in particular to FIG. 1 thereof, the preferred embodiment of the new and improved septic pipe field drain holders embodying the principles and concepts of the present invention and generally designated by the reference numeral 10 will be described.

Specifically, the present invention, the new and improved septic pipe field drain holders, is a system 10 comprised of a plurality of components. In their broadest context, such components include a shaft, a pair of horizontally disposed support rods, a supplemental horizontal rod, a pin and a chain. Such components are individually configured and correlated with respect to each other so as to attain the desired objective.

Figure 2:
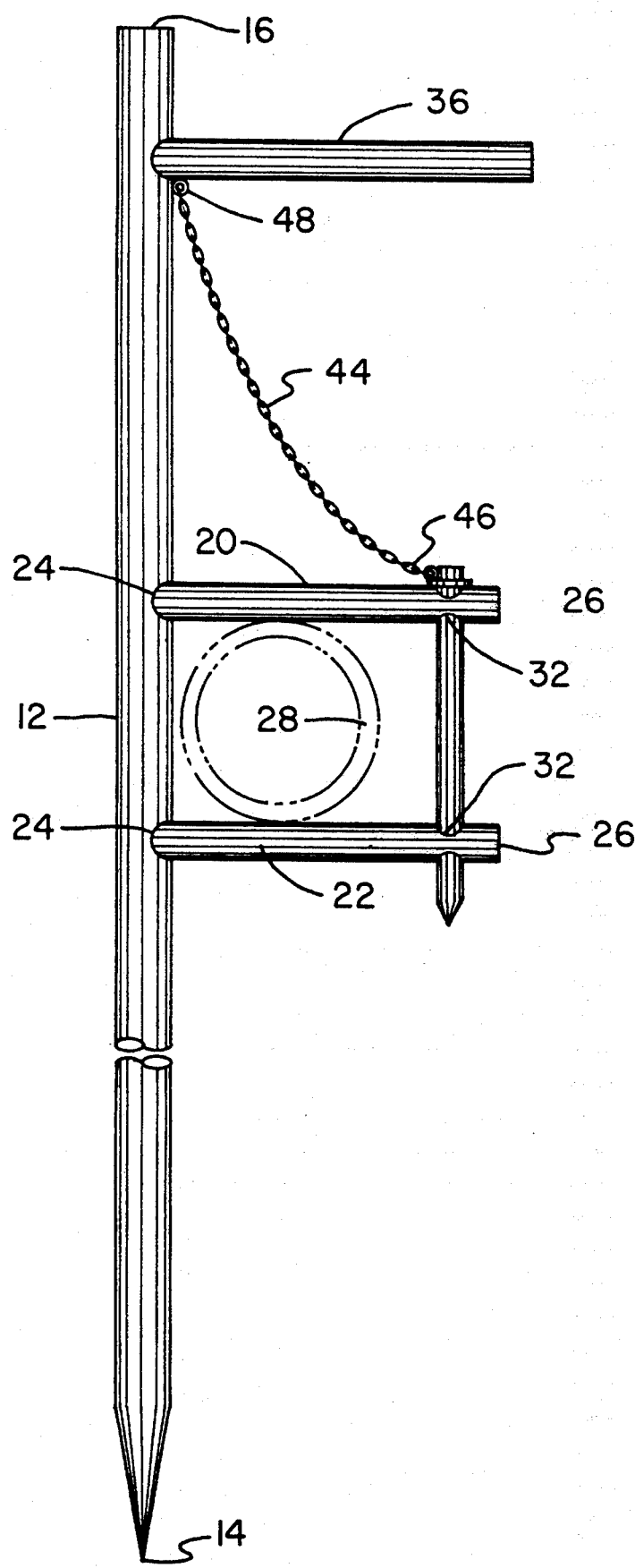
FIG. 2 is a front elevational view of one of the septic pipe field drain holders of the prior Figure.
Figure 3:
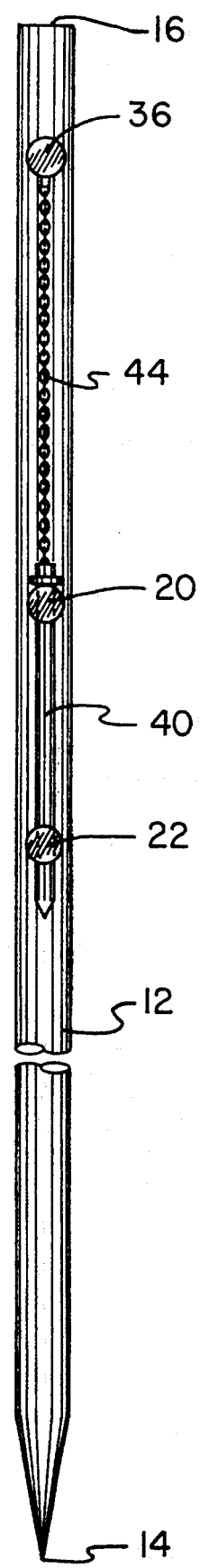
FIG. 3 is an end elevational view of the holder of the prior Figures without a pipe.

More specifically, the system 10 of the present invention, in the preferred embodiment of FIGS. 1 through 3, includes a vertically disposed shaft 12. The shaft has a lower pointed end 14 and an upper pressure applying end 16.

Next provided are a pair of horizontally disposed support rods including an upper support rod 20 and a lower support rod 22. The rods extend radially from the shaft in a horizontal orientation at intermediate points along the length of the shaft. The support rods have interior ends 24 coupled to the shaft and exterior ends 26 which form an opening for the receipt of a septic pipe field drain 28. It is such field drain pipe which is to be supported by the device of the present invention during leveling.

Each of the support rods has a vertically disposed apertures 32 in axial alignment with its associated aperture and rod. Such apertures are located adjacent to the exterior ends of the rod. They're so positioned so that the septic pipe field drain may be located resting on the lowermost rod with the uppermost rod therebetween in contact with the shaft and interior of the aligned apertures during operation and use.

Next provided is a supplemental horizontal rod 36. Such rod extends horizontally above the pair of horizontal support rods. It is connected to the upper end of the pipe. It functions to apply pressure through the forces applied by the user to drive the shaft downwardly along with its associated rods.

Next provided is an elongated pin 40. The pin has a pointed end adapted to be moved through the apertures of the associated support rods. The function of the pin is lock the pipe in position between the pin and the shaft vertically and between the pair of horizontally disposed support rods horizontally.

Lastly is provided a chain 44. The chain has a lower end 46 secured to the upper extent of the pin. The chain also has an upper end 48 secured to the pipe adjacent to the supplemental horizontal rod. The chain functions to preclude losing the pin in association with the device of the present invention.

Figure 4:
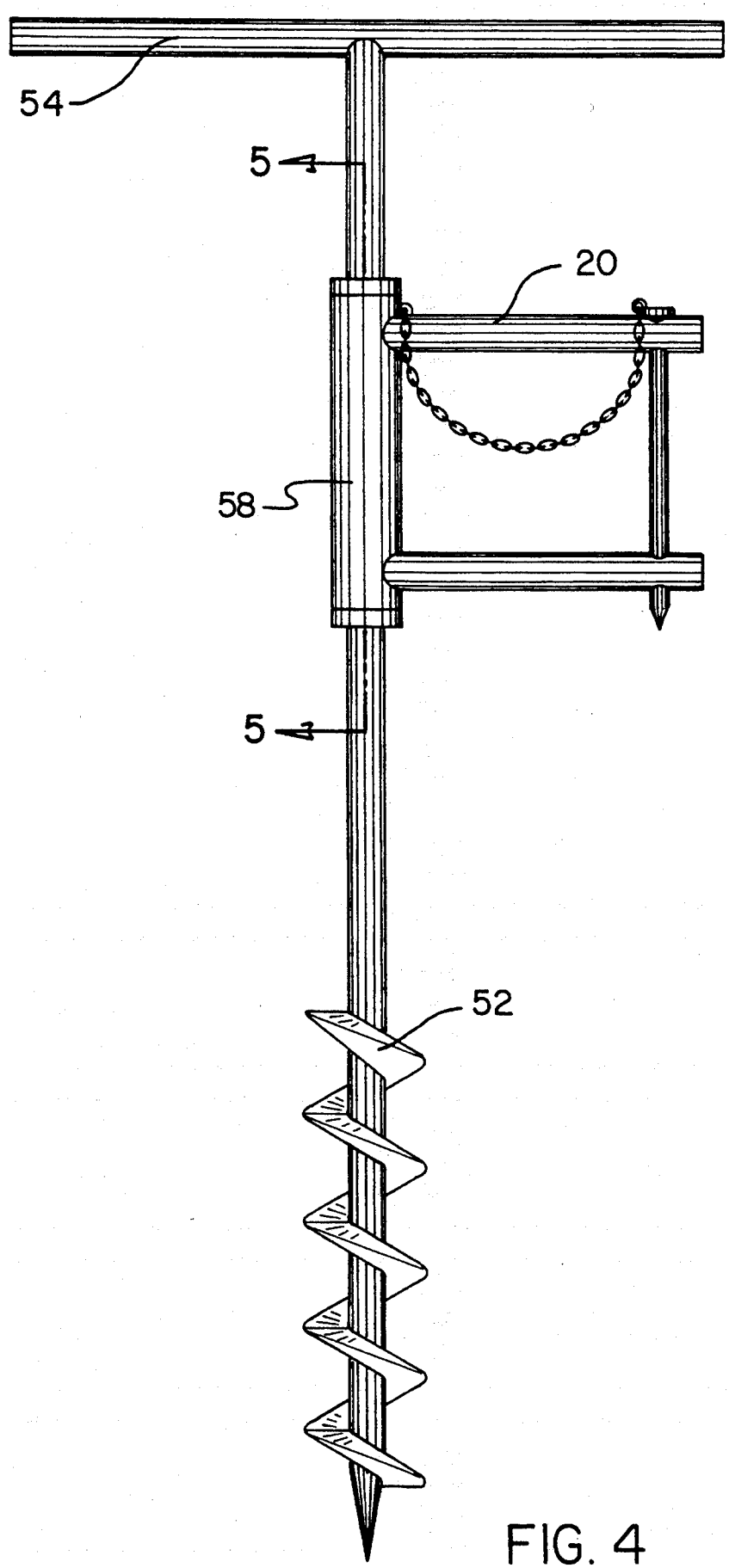
FIG. 4 is a front elevational view of an alternate embodiment of the invention.
Figure 5:
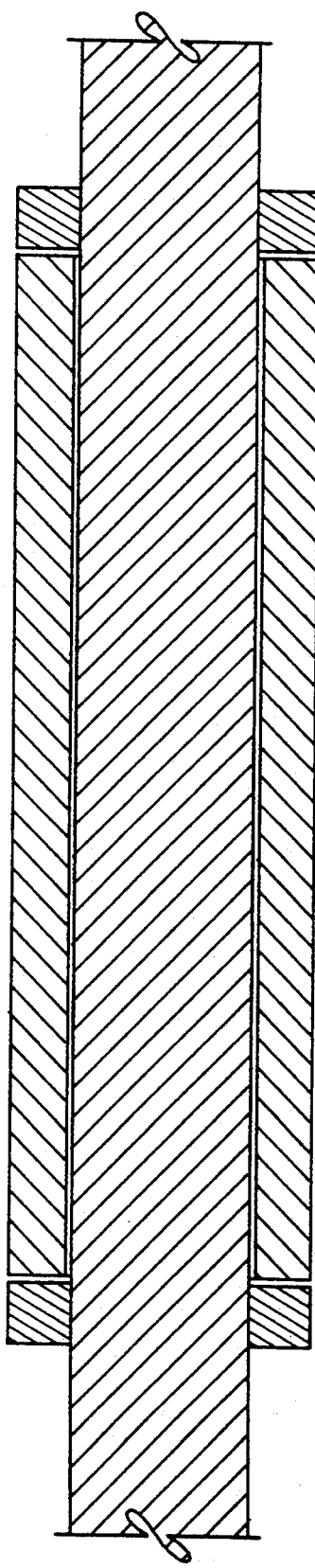
FIG. 5 is a cross sectional view taken along line 5—5 of FIG. 4.
Figure 6:
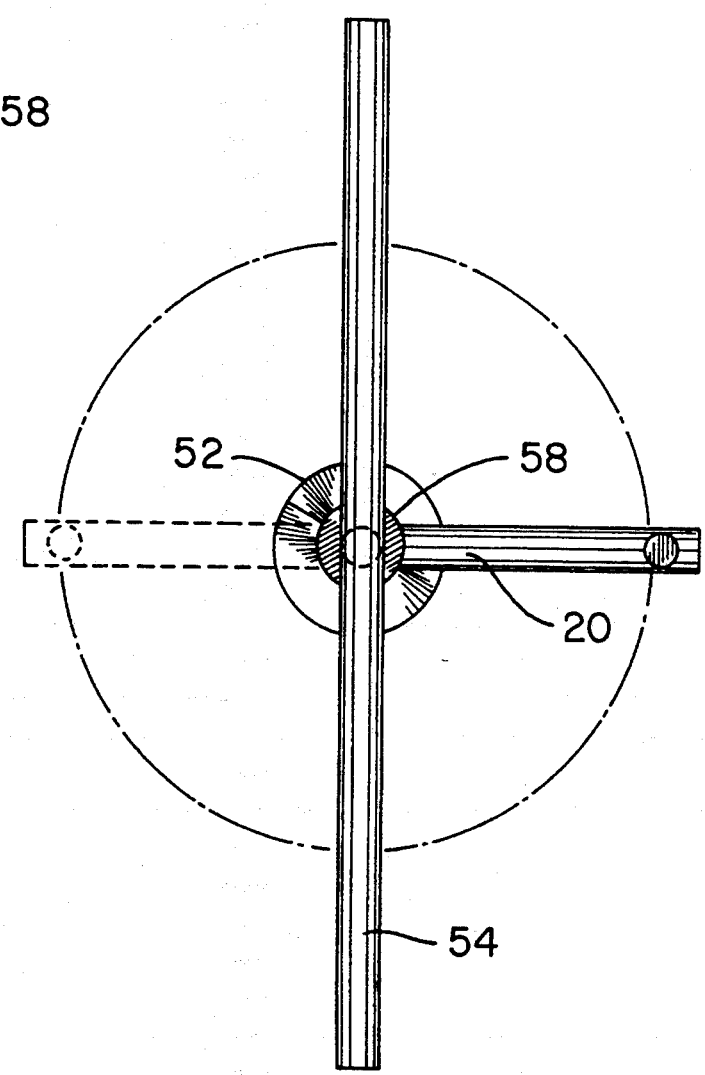
FIG. 6 is a top elevational view of the alternate embodiment of the invention as shown in FIGS. 4 and 5.

In addition to the foregoing, the present invention has includes an alternate embodiment of the invention as disclosed in the FIGS. 4, 5 and 6. Such alternate embodiment is similar to that described in the primary embodiment in that it includes a vertically disposed shaft, horizontally disposed support rods, a pin and a chain. In addition, however, the alternate embodiment includes a rigid spiral flight constituting a ground auger 52. The ground auger is formed in the lower end of the post above the point. It functions to facilitate the axial movement of the shaft through a screwing action upon rotation of the shaft. To this end, the supplemental support pipe 54 at the top of the shaft extends outwardly in opposite directions from the shaft rather than from one side thereof as in the primary embodiment. In this manner, the screwing action to the shaft may be effected by a user grabbing the supplemental support pipe on opposite sides of the shaft for efficiently effecting rotation thereof for driving the shaft downwardly or, upon reverse rotation, upwardly.

The last component of difference from the primary embodiment is a collar 58. The collar is rotatably mounted on the shaft adjacent to an intermediate extent above the auger. Holder rings 60 above and below, function to preclude axial movement of the collar with respect to the shaft. They will, however, allow rotational motion of the collar between the holder rings. The interior ends of the support rods are then attached directly to the collar for rotation therebetween. In this manner, the support rods may be retained in a fixed orientation with respect to the collar while the shaft is rotated to move the shaft, collar and support rods upwardly or downwardly as a function of the direction of rotation.

It's a ⅜ inch metal pole 36 inches long with a handle positioned at 34¼ inches from the bottom, 7¾ inches in length. It has two extensions to hold the pipe, one at a length of 20 inches measured from the bottom and the other 4¼ inches from that one. The extensions that hold the pipe are each 7 inches long. The pin should be 6½ inches long, ¼ inch wide and fit into a ¼ inch hole drilled 5 inches from the shaft, through both extensions. Attach a chain to the intersection of the handle and the shaft to hold the pin so you do not lose the pin when not in use.

To use: drive the holders into the ground holding the handle with one hand and pounding on the tip with the other and level the holders with a level long enough to go from one holder to the other. Insert the pipe and place the pin in the hole to lock the pipe in. After so much pipe is laid, according to health department specs, which would be 6 inches, 8 inches or 1 foot, stone is placed under the pipe, and covering the pipe 2 inches, the health department specs. Then pull the chain to release the pin, turn the holder to release the pipe and pull out of the ground.

Advantages: this method saves on cost and time and materials used to drive stakes in the ground. It saves on labor and people because one person can lay septic this way. It saves buying new stakes or poles each time, because they are reusable. It saves time, also by leveling the holders instead of the pipe. When you level the pipe using stakes, which other companies use, you have to pull the pipe up each time and pull or push the stakes further in the ground, instead of the holders.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A septic pipe field drain holder comprising:
   a vertical disposed cylindrical shaft having a lower pointed end and an upper pressure applying end;
   a pair of horizontally disposed cylindrical support rods coupled to and extending radially from the shaft in a horizontal orientation at intermediate points along the length of the shaft, the support rods having interior ends coupled to the shaft at fixed locations and exterior ends forming an opening of a fixed size for the receipt of a pipe to be supported, each of the support rods having a vertically disposed aperture in axial alignment adjacent the exterior ends;
   a supplemental horizontal rod extending horizontally above the pair of horizontal support rods for applying pressure to drive the shaft downwardly;
   a cylindrical pin positionable through the apertures of the support rods for locking the pipe in position therebetween to thereby define a rectangular space bounded by the pin and shaft vertically and by the rods horizontally for receiving and securing a pipe during operation and use; and
   a chain having a lower end secured to the upper extent of the pin and an upper end secured to the shaft adjacent to the supplemental horizontal rod.

* * * * *